Sept. 30, 1969 H. N. ESTERLY 3,470,359

ANTI-COUNTERFEIT DOCUMENT

Filed April 5, 1966 2 Sheets-Sheet 1

INVENTOR
HENRY N. ESTERLY

BY Francis W. Anderson
ATTORNEY

INVENTOR
HENRY N. ESTERLY

BY Francis W. Anderson
ATTORNEY 3,470,359

ANTI-COUNTERFEIT DOCUMENT

Henry N. Esterly, Cupertino, Calif., assignor to FMC Corporation, San Jose, Calif., a corporation of Delaware Filed Apr. 5, 1966, Ser. No. 540,386
Int. Cl. G06k 7/06
U.S. Cl. 235—61.11 4 Claims

ABSTRACT OF THE DISCLOSURE

Dielectric members are laminated together and externally printed to form a document of predetermined value or authenticity, such as a fare ticket with grid squares wherein a mark in a square indicates the devalued worth of the ticket. Conductive ink marks or stripes underlie rows of grids from edge to edge of the document, and the member carrying the marks is thin so that a marking tool impressed in a grid will electrically alter the conductivity of the stripe. Enlarged end portions of adjacent stripes may be individually capacitively coupled to radio frequency probes to compare the integrity of the marks to determine that the value indicated by the grids is in fact the genuine value of the document.

The present invention concerns a document construction which facilitates a determination of its authenticity by means of electronically readable, information carriers which are incorporated into the document.

The present invention is broadly useful in systems requiring machine readable information of any kind, and can be incorporated into various types of documents in order to ascertain if they are counterfeit or genuine, or have been altered with spurious information. A specific application in which the invention is particularly useful is for machine readable commute tickets in an automated ticket marking system for public conveyances, to determine if the value of a genuine ticket has been altered, or if the ticket is entirely counterfeit.

An object of the present invention is to provide a document which is impractical to counterfeit.

Another object of the present invention is to provide printed, non-magnetic information carriers that can be sensed without direct mechanical coupling thereto.

Another object of the invention is to provide a document with concealed, electrically readable and non-magnetic information that can be compared with magnetically recorded information incorporated in the document.

Another object is to provide a document having electrically readable, concealed information that cannot be accidentally erased.

Another object is to provide a laminated ticket bearing internal electrically readable markings that are capable of being permanently altered by the impression of a printing type mark applied to the outside of the ticket.

Another object is to provide a document bearing a conductive non-metallic stripe which is capable of functioning as an electrical capacitive coupling member.

A further object is to provide a document bearing non-magnetic, electronically readable information which can be read while the document is moving at high speed.

Further objects and advantages of the present invention will become apparent from the following description, and from the accompanying drawings illustrating a preferred embodiment of the invention, wherein.

Figure 1:
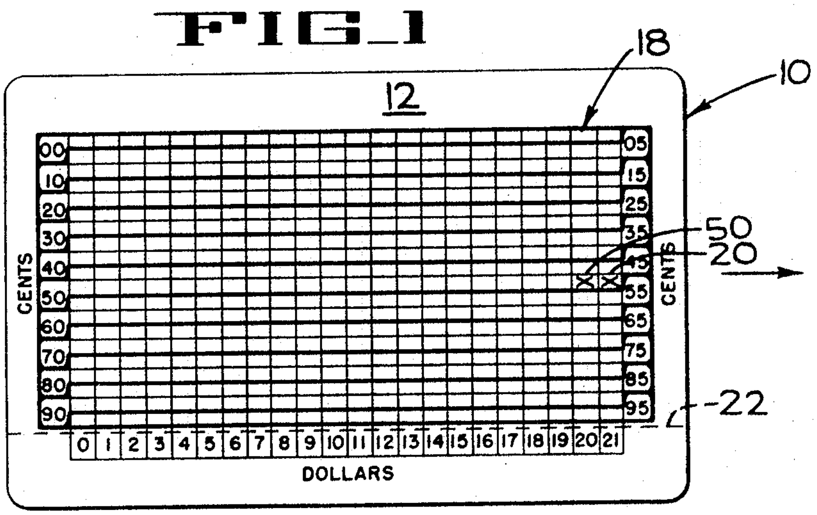
FIGURE 1 is a plan of a known type of commute ticket where marks in predetermined grid apertures indicate the value of the ticket.

Before proceeding with the description of the particular document construction of the present invention, the environment of one of its intended uses should be briefly described. A recent development in public transportation systems comprehends the use of individual automatic ticket processing machines for entrance and exit gates at the various stops along a rail transport system. A commute passenger using the system will initially purchase, from a vending machine, a multi-ride ticket 10 (FIG. 1) which on one side, not shown, has various instructions for the use of the ticket, and on its other side has a printed value grid 18. The ticket has an iron oxide recording strip on its underside, between the dotted line 22 and the adjacent edge of the ticket, which is magnetically recorded by the vending machine with information such as the value of the ticket, the date and other information. The recording strip is also used for magnetic recordings by one of the automatic ticket processing machines as the passenger leaves through an exit gate in the transport system.

To gain entrance to the system, the passenger inserts his ticket into the automatic "entrance" ticket machine at an entrance gate which includes a turnstile. The pertinent functions of this ticket machine, insofar as the present invention is concerned, are that it magetically records the station location, opens the turnstile to admit the passenger, and returns his ticket. No marks are made in the value grid 18. When the passenger disembarks at his station, he places the ticket into the automatic "exit" ticket machine at an exit gate which also includes a turnstile. This ticket machine, and cooperating computer apparatus, determines from the magnetic recording if the ticket has sufficient value for the ride just completed, places a mark, such as the X mark at 20 to show the now degraded value of the ticket, opens the turnstile, and returns the ticket. If the recording on the ticket shows insufficient value for the ride when the ticket is placed into the ticket machine at the exit gate, the turnstile will not open, and the passenger must consult the station agent to settle the matter. The X mark in the value grid 18 is only for the information of the person owning the ticket; as far as the ticket machines are concerned, the value of the ticket is indicated by the magnetic recordings thereon.

One drawback of the system above described is that the tickets are never visually inspected, except in rare instances when the station agent must be consulted. Thus, it would be fairly easy for a knowledgeable person to copy the magnetic recording of a new ticket onto a used ticket after magnetically erasing its old recordings, or to place a similar recording on a ticket-size card. Because only the magnetic recording governs the value of the ticket in the transportation system, a dishonest passenger could use a spurious or altered ticket without detection as long as the ticket or ticket-size card was not visually inspected.

In general terms, the present invention provides indiscernible, non-magnetic, electronically readable information within or upon the ticket, which information is correlated to the value of the ticket as indicated by the magnetically recorded information on the recording strip at 22. This non-magnetic information is automatically devalued in dollar increments as the trip fares are marked upon the value grid 18.

The ticket 10 (FIGS. 1 and 2) is provided with a thin, opaque upper sheet 12, to the underside of which a black coating material or separate black sheet 14 is ultimately bonded. A bottom sheet 16 is bonded to the ticket and is formed of relatively thick, rigid stock to lend strength and durability to the entire assembly. The underside, not shown, of the bottom sheet is imprinted with instructions for the proper use of the ticket with the automatic ticket-processing machines at the entrance and exit gates of the rail transport system. In general, and as is specifically disclosed in the patent application of Richard Heaney et al., Serial No. 649,084, assigned to the same assignee as the assignee of the present invention, the purpose of the black undercoating or black lamination 14 is to provide a visible mark on the value grid 18 when the ticket machine at the exit gate causes a marking tool, such as a tool for the X mark at 20, to strike the upper sheet 12, thus causing the black to show through the upper sheet. If desired, the tool can be designed to sever or shred the upper sheet 12.

The value grid markings 18 printed upon the upper surface of the upper sheet 12 are indexed to indicate the degraded value of the ticket where the X mark is impressed each time the ticket is used. The total value of the illustrated ticket is twenty-two dollars, when new, Thus, a first fare which would cause the marking of the ticket by the X mark at 20, directly indicates that the now remaining value of the ticket is twenty-one dollars and fifty cents, and indirectly indicates that the preceding fare was fifty cents. The magnetic recording strip 22 was recorded by the ticket machine at the exit gate to indicate the new value of the ticket.

After each ride, the ticket is visibly and magnetically devalued by the amount of the fare, and the passenger finds the remaining value of his ticket by reading the indicated value of the leftmost, lowermost X mark.

The ticket machines sense the value of the tickets by reading the magnetically recorded information. Therefore, if the passenger or a counterfeiter were to then replace the magnetic recording with the recording from a new ticket, the ticket would be undetectable from a new ticket by the ticket machines. In other words, because the ticket marking process is not machine readable, the used ticket or a facsimile is as good as a new ticket if the magnetic information is replaced with information indicating that the ticket is worth twenty-two dollars. Also, a used ticket could be continually "upgraded" so that its recording indicated a value of any amount over the price of the fare, and could thus be used for a long time after its genuine value was gone.

Figure 2:
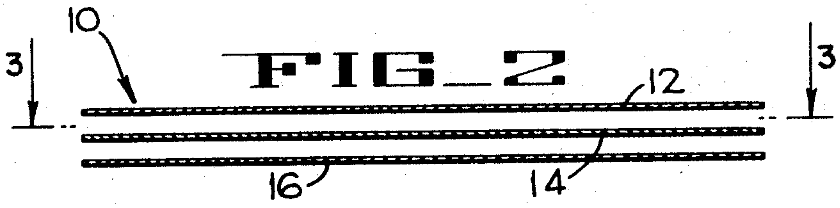
FIGURE 2 is an exploded, diagrammatic section of the ticket shown in FIGURE 1.
Figure 3:
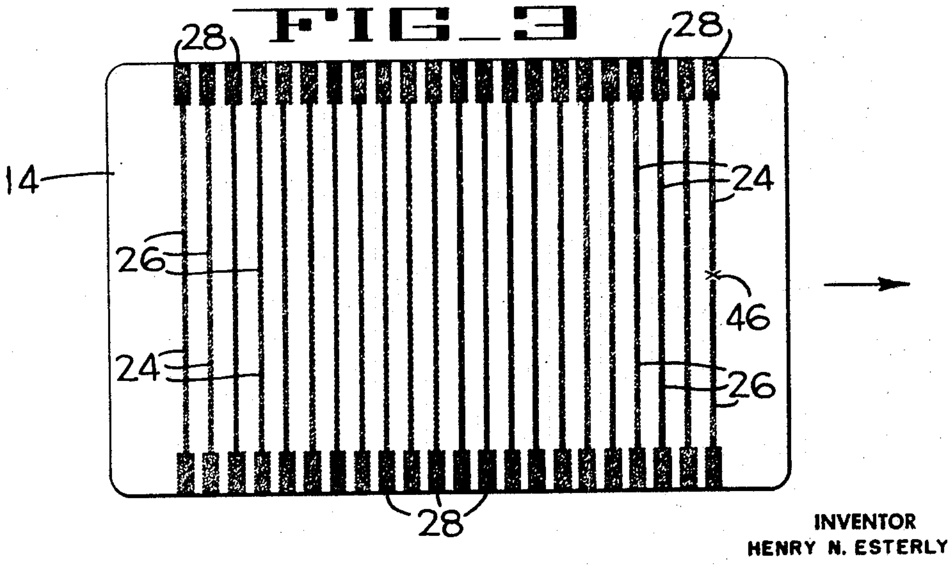
FIGURE 3 is a plan, taken along line 3—3 on FIGURE 2, showing the upper face of the center laminar member and, in accordance with the present invention, particular markings which are printed thereon.

In order to determine whether or not the magnetically stored information signal indicates a sufficient remaining value of the ticket for the last fare to be deducted from the ticket, or to determine if the ticket is totally counterfeit, the present invention provides concealed, non-magnetic, electrically sensible information, within the structure of the laminated ticket 10, which can be compared with the magnetically stored information when the ticket is inserted in the ticket machine at the exit gate. For this purpose, the ticket incorporates a plurality of internal conductive-ink marks 24 (FIG. 3) which are each centrally located with respect to one of the vertical dollar columns 0–21 (FIG. 1).

In the case of the illustrated construction in which a separate black center sheet 14 (FIG. 2) is used, the conductive-ink marks may be printed upon its upper surface, that is, the surface underlying the upper sheet 12. If the central sheet 14 is dispensed with, and a black coating on the undersurface of the upper sheet 12 is used instead, the conductive-ink marks can be printed directly on the coating. As will later appear, other structural variations can be used within the broad concept of the invention. In any case, when the X mark is made in any one of the apertures of the value grid 18, the conductive-ink mark 24, which corresponds to the column where the mark is placed is permanently altered due to the action of the marking tool which causes a break in the conductive-ink mark as it presses the upper sheet 12 toward the bottom sheet 16.

One suitable ink which can be used to print the conductive-ink marks 24 is manufactured by the Sinclair and Valentine Division of Martin Marietta Corporation, 611 West 129th Street, New York City, New York, and is identified as Letter Press EC Black #259–560. It will be apparent that the black conductive-ink marks 24 are virtually indistinguishable upon the black center sheet 14. Accordingly, the destruction of a genuine, interbonded, laminated ticket by a possible counterfeiter to determine its inner construction, will not reveal the markings, especially if the sheets 12 and 14 are of paper stock and the fibers are impregnated with whatever bonding agent may be used so that they are randomly torn loose when the laminations are separated.

Each of the conductive-ink markings 24 (FIG. 3) comprises a narrow center stripe 26, and an enlarged tab portion 28 on each end of the stripe. The markings 24 are all of uniform size, whereby their electrical resistances fall within a narrow range of values, in the present instance in the range between about 30K to 32K ohms. The tabs 28 have greatly increased surface area per unit of length than the stripe portions 26, and form, in effect, conductive plates which are each adapted to function as one structural element of a parallel plate capacitor.

When a passenger boarding the system at an entrance gate at any station along the system inserts his ticket into the entrance ticket machine, and if the ticket is genuine and unused, there is no mark on the value grid 18 (FIG. 1), and the information which was magnetically recorded on the iron oxide coating at 22 at the time the ticket was purchased indicates that the value of the ticket is twenty-two dollars. After the ticket is inserted into the entrance ticket machine, the ticket is conveyed at a constant speed and the recorded information is read by a reading head coupled to a remote computer. If the recorded information on the ticket signals the computer that the ticket is worth at least the value of the completed ride, the previously recorded information is erased and new information corresponding to the new value of the ticket is recorded in its place. In order to forestall partial or total counterfeiting of the tickets, the non-magnetic conductive-ink markings 24 of the present invention are utilized to determine the validity of the ticket as it moves through the exit ticket machine when the passenger leaves his destined station.

Figure 4:
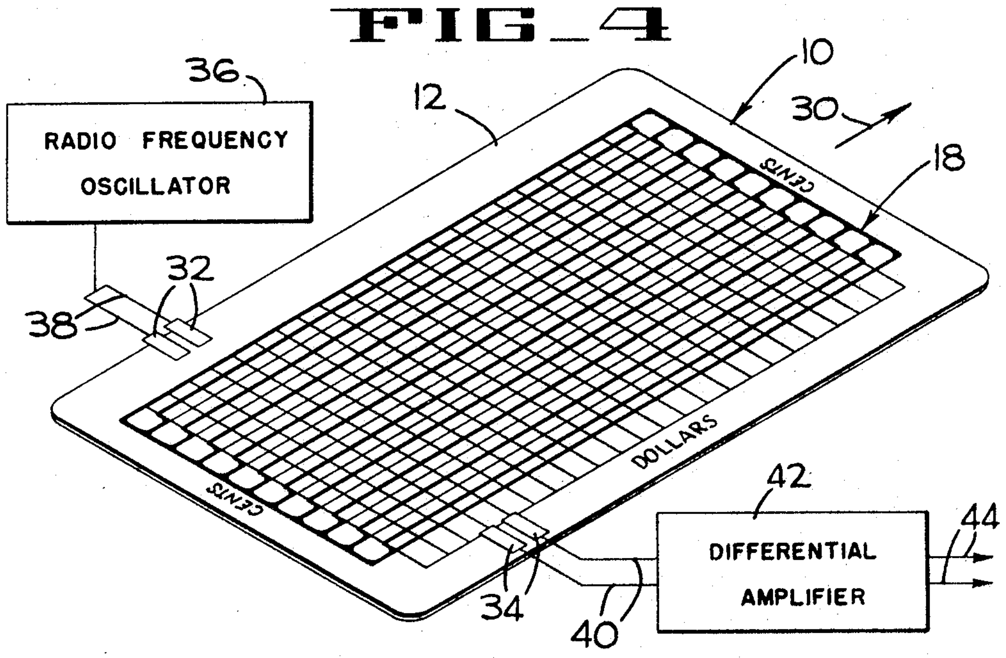
FIGURE 4 is a schematic isometric of a ticket incorporating machine readable, concealed information according to the present invention, and means for sensing the information.
Figure 5:
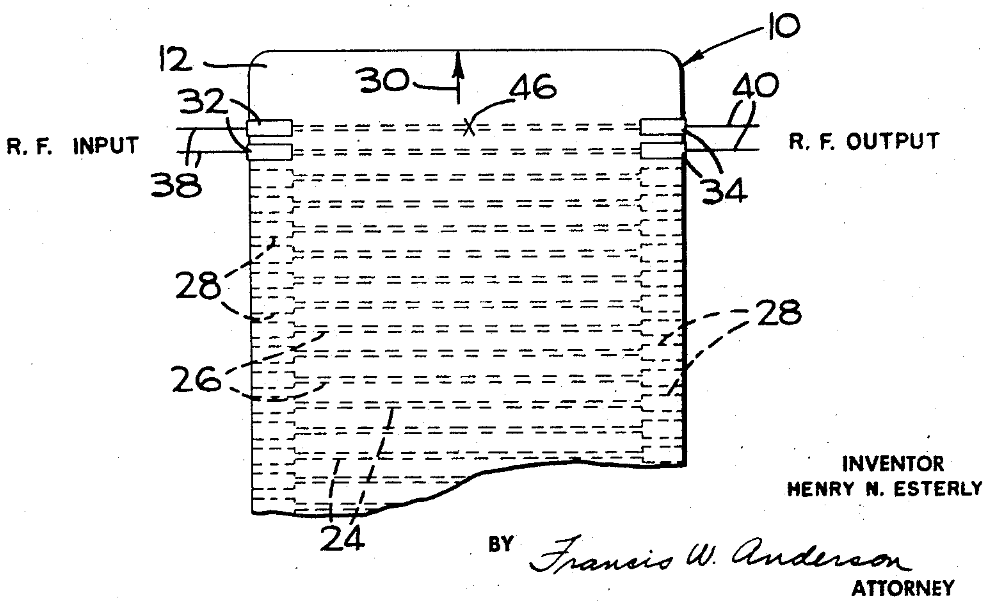
FIGURE 5 is a schematic plan of the ticket shown in FIGURE 4, and a part of an electrical sensing apparatus for reading information contained within the ticket.

For this purpose, the ticket 10 (FIGS. 4 and 5) is transported in the exit ticket machine in the direction of the arrow 30 in a path contiguous to a first fixed pair of metallic radio frequency oscillator probes 32 and a second fixed pair of radio frequency amplifier probes 34 which are aligned with the first pair across the width of the ticket. The probes 32 and 34 are of about the same size as the tabs 28 of the conductive-ink markings 24, have the same transverse and longitudinal interspacing as the tabs 28, and lie close to the upper surface of the top sheet 12 of the ticket.

A radio frequency oscillator 36, such as a conventional Hartley oscillator circuit having, for example, a standard component frequency of 455 kilocycles, feeds radio frequency current through common leads 38 to both of the oscillator probes 32. The amplifier probes 34 are connected to individual input lines 40 of a differential amplifier 42 having an electronic bridge circuit for comparing the amplitude of two radio frequency signals. The pairs of probes 32 and 34, in conjunction with the tabs 28 of the conductive-ink marks 24, and the interposed dielectrics formed of the air gap and the upper ticket sheet 12, comprise capacitors, by which means the radio frequency current is capacitively fed into and out of the unsevered conductive-ink marks 24.

The radio frequency current thus transmitted from the oscillator 36 through each successive two of the conductive-ink markings 24 and into the bridge circuit of the differential amplifier 42 are rectified and compared. If all of the marks 24 are in an unused ticket, they are all unsevered and conductive, and because all the stripes 26 have substantially the same resistance, there is no effective difference between the amplified signal produced by each stripe 26. The bridge circuit of the differential amplifier 42 is thus balanced so that no signal is produced in the output lines 44 of the differential amplifier 42.

If the ticket has been previously used, such as the ticket shown in FIGURE 1, the X mark has severed the conductive-ink mark 24 at 46 (FIGS. 3 and 5), whereby that stripe 26 is non-conductive. Thus, when the moving ticket becomes indexed with the probes 32 and 34 to sense the continuity of the first and second stripes 26, which stripes underlie the dollar columns 21 and 22, the bridge circuit of the differential amplifier 42 is unbalanced because the first stripe is severed.

This condition causes the output lines 44 of the amplifier to send out a signal voltage which actuates an electronic counter. The counter is a part of allied apparatus, not shown, the details of which are not critical to the present invention. The counter determines the remaining number of uncut stripes, or in other words the remaining value of the ticket to the nearest dollar, and this information is electronically compared with the magnetically recorded information to ascertain if they agree. If not, the ticket is rejected by the exit ticket machine, and the passenger must consult the station agent since the exit gate will not open.

The station agent is also provided with a machine for reading the continuity of the visible conductive-ink markings, and it can thus be immediately and conclusively determined whether or not the ticket is counterfeit. If the ticket is an upgraded used ticket, the X marks in the value grid will indicate that fact and the station agent need not test the conductivity of the conductive-ink marks. It can also be determined if the value grid has been restored on a used ticket because the conductive stripes will have been cut and will be so indicated by the station agent's machine.

The maximum fare per ride with the ticket herein disclosed is one dollar. The reason for this maximum is that because a conductive-ink marking underlies each dollar column, successive conductive stripes 26 will be cut as the ticket is automatically degraded by the use of any fare between five cents and one dollar less than the ticket value indicated by the last uncut stripe. This enables the control system, initiated by sensing adjacent cut and uncut stripe portions, to be governed by a relatively simple counting and control system. If the maximum fare is over one dollar, the same benefits of this control system can be obtained by eliminating every other conductive-ink marking 24. Thus, if the maximum fare is a dollar and a half, only the markings 24 which coincide with the odd-numbered dollar columns of the value grid 18 would be printed on the ticket, and the pairs of probes 32 and 34 would be spaced apart to match adjacent pairs of the markings 24. The ticket can still be "read" to the nearest dollar because, as an example, an X mark at 50 (FIG. 1), following the mark X at 20, would indicate a dollar and a half fare, but would not sever any conductive stripe since none would be present in that column. Accordingly, the counting process would only begin when the probes 32 and 34 indexed with the uncut conductive stripes in the 19 and 17 dollar columns, whereby the maximum value of the ticket would be shown as nineteen dollars instead of its actual value of twenty dollars and fifty cents.

It will be apparent from the preceding description that the conductive-ink marks and continuity detection means of the present invention are capable of wide use to convey machine readable information and can be incorporated into many types of documents to verify their authenticity, or to determine if they have been altered to change given values or conditions indicated on the faces of the documents. The documents are well adapted for extremely fast, computerized checking since the capacitive coupling of the radio frequency oscillator and amplifier to the conductive-ink markings is effective while the document is moving at high speed. The conductive-ink markings can also be read while the document is stationary, by using movable probes to scan the markings.

It is also contemplated that the conductive-ink marks can be used as information bits in a computer system whereby a particular sequence and pattern of markings are representative of certain information such as the contents of a carton, or of credit data on a credit card. In particular, it should be noted that the document does not necessarily have to be of laminar construction, and that conductive-ink markings printed in one color upon an outer surface of the same color may be employed without detection, particularly if the markings are overprinted with legends in ordinary, non-conductive ink.

A further point worthy of note is that the conductivity of the stripes 26 can be determined with only a single oscillator probe 32 and a single amplifier probe 34, although the present pairs of dual probes and the bridge circuit provide more reliability since most conditions, such as moisture, which may alter the resistance characteristic of one stripe will most likely affect the adjacent stripes to the same extent. Accordingly, if the severed portion of a stripe is bridged by moisture, the adjacent stripes will likely have a higher resistance from the same moisture condition, and the differential amplifier will detect this difference between the moist severed stripe and the moist unsevered stripe. However, the conductive-ink markings could be readily protected with various protective coatings, including thermoplastics and lacquers, if single probe detection is employed.

Having thus described the invention, that which is believed to be new, and for which protection by Letters Patent is desired, is:

1. A fare ticket comprising at least two dielectric members bonded together at their confronting faces to form a laminar unit, a plurality of interspaced conductive ink markings printed on one of said faces and extending from one edge of the printed face to the opposite edge, and means defining grids on the outer exposed face of one of said members in straddling alignment with said markings, the latter member being relatively thin so that a marking tool impression in one of said grids is capable of electrically altering the underlying conductive ink marking without perforating the ticket.

2. A ticket according to claim 1 wherein the conductive ink markings and the surface upon which they are imprinted have substantially the same color to render the conductive ink markings visually imperceptible upon delamination of the bonded dielectric members.

3. The ticket of claim 1 wherein said conductive ink markings have substantially the same electrical resistance and wherein each marking is provided with enlarged end portions to facilitate capacitive coupling thereto.

4. The fare ticket of claim 3 and further including first capacity coupling means adjacent each enlarged end portion of one adjacent pair of conductive-ink markings, means for inducing radio frequency energy into said capacity coupling means at one of the common end portions of said markings, second capacity coupling means individual to the other end portions of said markings, and a differential amplifier connected to said latter coupling means for electrically comparing the integrity of the two markings.

References Cited

UNITED STATES PATENTS

| | | | |
|---|---|---|---|
| 1,567,325 | 12/1925 | Lasker. | |
| 2,416,625 | 2/1947 | Hooper | 235—61.116 |
| 2,448,761 | 9/1948 | Armbruster. | |
| 2,774,060 | 12/1956 | Thompson. | |
| 3,171,100 | 2/1965 | Rajchman | 340—173 |
| 3,373,409 | 3/1968 | Lord | 340—173 |

MAYNARD R. WILBUR, Primary Examiner

SOL SHEINBEIN, Assistant Examiner

U.S. Cl. X.R.

235—61.12, 61.7; 340—149, 173